Figure 1:
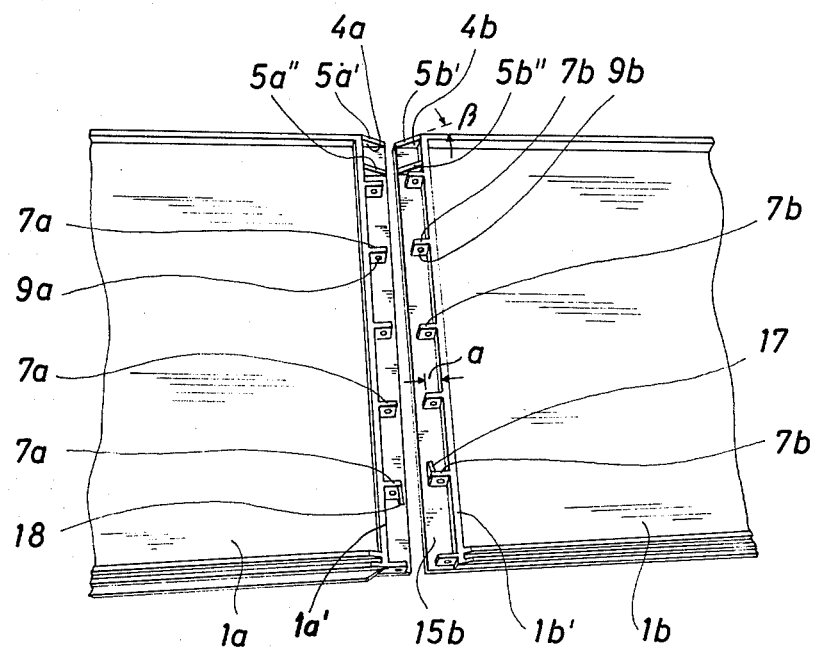

United States Patent [19]

Mikkelsen et al.

[11] 4,231,203
[45] Nov. 4, 1980

[54] UNIT JOINT FOR CONNECTING TWO ANGULARLY ARRANGED PANEL UNITS

[75] Inventors: Henrik Mikkelsen, Copenhagen; Bjarne B. Andersen, Holte, both of Denmark

[73] Assignee: Inter-Ikea A/S, Humlebaek, Denmark

[21] Appl. No.: 935,177

[22] Filed: Aug. 21, 1978

[30] Foreign Application Priority Data

Jun. 15, 1978 [DK] Denmark .............................. 2700/78

[51] Int. Cl.² .............................................. E04B 5/00
[52] U.S. Cl. ........................................ 52/284; 52/585; 217/65; 220/4 F
[58] Field of Search .................. 52/285, 585, 586, 583; 220/4 F, 80; 217/65

[56] References Cited

U.S. PATENT DOCUMENTS

| | | | |
|---|---|---|---|
| 390,421 | 10/1888 | West | 52/285 |
| 2,521,279 | 9/1950 | Becker | 52/585 |
| 3,001,613 | 9/1961 | McBerty | 52/586 |
| 3,088,178 | 5/1963 | Propst | 52/585 |
| 3,160,245 | 12/1964 | Pavlecka | 52/586 |
| 3,191,726 | 6/1965 | Pavlecka | 52/586 |
| 3,618,991 | 11/1971 | Edwards | 52/285 |
| 3,832,817 | 9/1974 | Martens | 52/583 |
| 4,034,527 | 7/1977 | Jalasjaa | 52/586 |

Primary Examiner—Price C. Faw, Jr.
Assistant Examiner—Henry E. Raduazo

[57] ABSTRACT

A unit joint for connecting two panel units. The narrow edge surface of each panel unit has a plurality of angle guide surfaces abutting a plurality of angle guide surfaces of the adjacent panel unit in order to determine the mutual solid angle of the panel units. The narrow edge surface of each panel unit furthermore has a plurality of apertured coupling ribs, the apertures being substantially coaxial. The ribs on the first panel unit project between the corresponding projections on the second panel unit. A common locking rod extends through all the apertures of the ribs in order to draw the panel units tightly together.

10 Claims, 6 Drawing Figures

U.S. Patent  Nov. 4, 1980  Sheet 1 of 2  4,231,203

UNIT JOINT FOR CONNECTING TWO ANGULARLY ARRANGED PANEL UNITS

The invention relates to a unit joint for connecting two angularly arranged panel units at their abutting edge surfaces.

It is known to connect two mitre cut frame portions by shaping an undercut recess in each inclined surface, the recesses opposing each other. A locking unit is longitudinally inserted through the apertures, said locking unit having a cross section like he figure of eight. This joint is, however, rather weak since the locking unit easily risks being longitudinally cracked when the joint is loaded.

The object of the invention is to provide a unit joint of the above type, which presents a great angular stability and is very easy to mount, and which only involves a small risk of longitudinal cracking of the locking portions.

The unit joint according to the invention is characterized in that the narrow edge surface of each panel unit comprises at least one angle guide surface abutting at least one angle guide surface of the adjacent panel unit in order to determine the mutual solid angle of the panel units, and that the narrow edge surface of each panel unit comprises a plurality of coupling projections, preferably in the form of narrow ribs, said projections being provided with apertures substantially coaxially arranged, said projections on the first panel unit—when the joint has been established—projection between the corresponding projections on the second panel unit, and that a common locking rod extends through all the apertures. The angle guide surfaces ensure the desired angular stability. The locking rod is usually—when influenced—subjected to a rather high number of small transverse forces distributed along the locking rod; thus it has only a rather small tendency to crack lengthwise. The unit joint is very easy to mount and very reliable. When the unit joint for instance is used in a playbox with four wall panels, a user can—when the wall units are piled in a compact pile inexpensive to transport—easily figure out how to mount the panels two by two and insert a locking rod in the apertures, whereby the panels are locked two by two.

According to the invention the common axis of the apertures of the projections on the first panel unit may be slightly displaced to the side of the common axis of the apertures of the projections on the second panel unit, whereby the locking rod when inserted presses on the aperture edges of the projections. As a result the locking rod draws the two panels tightly together.

Furthermore according to the invention the projections may be situated in such a manner on the panel units that at least two projections on one panel unit project between two neighboring projections on the other panel unit. As a result the units cannot be mutually displaced to the sides.

Moreover according to the invention the aperture edges of the projections may comprise resilient, small projections, optionally pointing slightly to the side of the center of the aperture. As a result a somewhat resilient joint is obtained.

According to the invention the angle guide surfaces of the auxiliary ribs may form an angle of substantially 45° with the plane of the panel unit. This is particularly preferred when the two units are to form a solid angle of 90°.

Furthermore according to the invention an auxiliary rib may be integral with a projection provided with an aperture. In this manner a simple construction is obtained.

Moreover according to the invention the panel units may be top, bottom or side walls in furniture, such as tables, in particular coffee tables, and cupboards, storing systems for furniture, playboxes and flower boxes. The unit joint has proved to be particularly well suited for such purposes.

Furthermore according to the invention the projections provided with apertures and the auxiliary ribs may have a length substantially equal to the thickness of the panel unit, said length being measured in a direction perpendicular to the edge surface of the panel unit. As a result the unit joint possesses an appropriately high strength.

According to the invention the projections of each panel unit, which are provided with apertures, and the auxiliary ribs may be mutually connected by means of a supporting wall member of the panel unit in question. In this manner the projections and the auxiliary ribs are hidden.

Finally according to the invention each coupling projection at its outer end may be provided with a stabilizing fin projecting to one side, the stabilizing fins on the projections of one panel unit facing a direction opposite that faced by the stabilizing fins of the projections on the second panel unit, said fins preferably being triangular. As a result further bracing of the projections is obtained, whereby the strength of the unit joint is increased.

Figure 2:
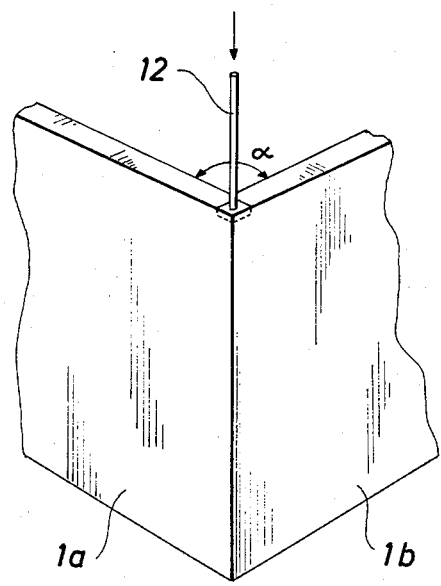
Figure 3:
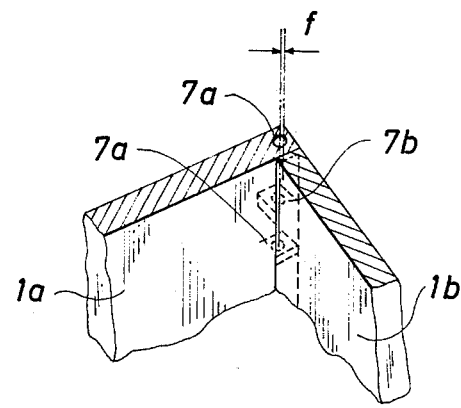
Figure 5:
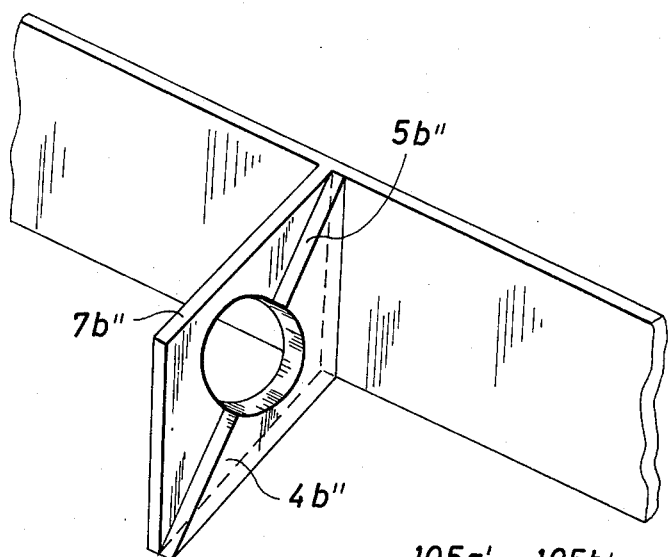
Figure 4:
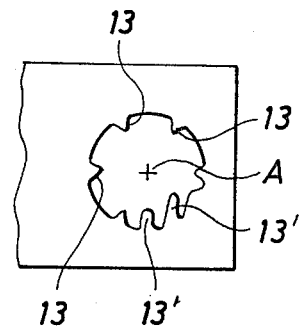
Figure 6:
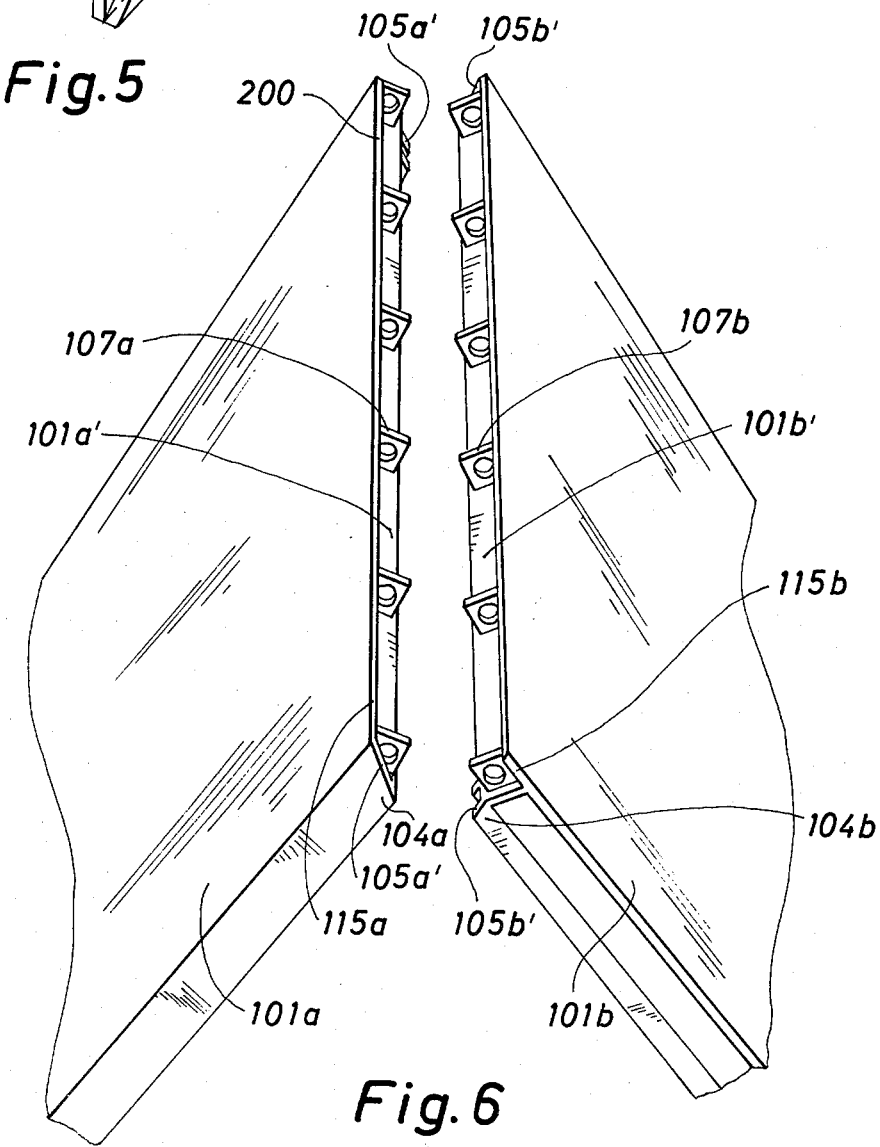

The invention will be described below with reference to the accompanying drawings, in which FIG. 1 illustrates two panel units loosely arranged side by side, and which may form part of a joint according to the invention, FIG. 2 illustrates the two panel units of FIG. 1, whereby the unit joint is provided, said panel units forming a solid angle of 90°, FIG. 3 illustrates a unit joint between two panel units, whereby the common axis of the apertures of the projections on one panel unit is slightly displaced to the side of the common axis of the apertures of the projections on the second panel unit, FIG. 4 is a side view of a projection, the aperture edge of the projection being provided with small projections, FIG. 5 is a perspective view of a projection and an auxiliary rib integrally formed, and FIG. 6 illustrates a second embodiment of the panel units arranged somewhat separated, before the joint is provided.

The units 1a and 1b illustrated in FIG. 1 comprise some angle guide surfaces 5a', 5a'', 5b', 5b'' at the narrow edge surfaces 1a' and 1b' facing each other. These angle guide surfaces serve to determine the angle α, cf. FIG. 2, formed by the two units when the unit joint is provided. A plurality of coupling projections 7a and 7b, preferably formed as narrow ribs, are furthermore provided on the narrow edge surfaces 1a' and 1b'.

Each projection 7a, 7b is provided with an aperture 9a, 9b. The apertures 9a are concentrically arranged, and this also applies to the apertures 9b. Usually, each projection 7a is situated in the spacing between two neighboring projections 7b. In certain cases, however, at least two projections on one panel unit must project between two neighboring projections on the other panel unit in order to prevent the panel units from being displaced to the side relative to each other.

A common locking rod 12 extends through all the apertures when the joint is mounted.

When the unit joint is used in a playbox with plane top, bottom or side walls, the panel units forming said walls may be of plastic, whereas the locking rod may be of wood.

As illustrated in FIG. 3, the common axis of the apertures 9a may be slightly displaced to the side of the common axis of the apertures 9b. The displacement being some tenths millimeter is indicated highly magnified at f. When the locking rod is inserted, it is permanently retained due to the pressure exerted by the aperture edges. Therefore, the unit joint is very efficient.

As illustrated in FIG. 4, some small resilient projections 13 facing the axis A of the aperture in question may project from the aperture edge of each projection 7a or 7b. These small projections may point in a direction not passing through the center of the aperture, as illustrated at 13'. FIG. 1 illustrates how the guide surfaces 5a' and 5b' are provided on auxiliary ribs 4a and 4projecting from the narrow edge surfaces on the panel units. A large number of such auxiliary ribs may be provided. The solid angle $\beta$ formed by the angle guide surfaces and the main plane of each panel unit, is preferably 45°, when the solid angle $\alpha$, cf. FIG. 2, to be formed by the panel units is 90°.

FIG. 5 shows how a projection 7b'' provided with an aperture may be integral with an auxiliary rib 4b''. The guide surface 5b'' is clearly visible on the auxiliary rib.

FIG. 1 illustrates how the projections 7a and 7b provided with apertures and the auxiliary ribs 4a and 4b have a length substantially equal to the thickness t of the individual panel unit. The apertured projections and the auxiliary ribs of each panel unit may as shown in FIG. 1 by mutually connected by means of a supporting wall member 15b on the panel unit in question. This wall member may, as far as each panel unit comprises two parallel walls, be an extension of one wall.

A second embodiment of the panel units appear from FIG. 6 at 101a and 101b, just before the joint according to the invention is provided, and a rod is inserted through all the apertures of the projections 107a and 107b. it clearly appears, how the narrow edge surfaces 101a', and 101b' of the panels together with the supporting wall members 115a and 115b hide the projections 107a and 107b within a shaft with a substantially square cross section, when said wall members are almost pressed together. The supporting wall members 115a and 115b are bevelled at the joint to form further angle guide surfaces. The angle guide surfaces generally provided on auxiliary ribs appear at 105a' and 105b'.

The unit joint according to the invention is particularly applicable for panel units in furniture, such as tables, in particular coffee tables, and cupboards, storing systems for furniture, playboxes and flowe boxes.

The invention may be varied in many ways. Thus the projections 7b may for instance at the outer end comprise a stabilizing fin 17, cf. FIG. 1, and the projections 7a may comprise a stabilizing fin 18 pointing in a direction opposite that of the fin 17. The stabilizing fins are preferably of a triangular cross section (seen in a section parallel to the narrow edge surface 1b').

If necessary, an angle guide surface 200 may be shaped on the outer edge of the supporting wall members 115a or 115b.

We claim:

1. In combination: two panel units arranged at an angle with respect to each other, each panel unit having a relatively narrow edge surface and a wall surface projecting beyond said edge surface towards the other unit, each edge surface comprising at least one rib having an angle guide surface abutting the angle guide surface on a corresponding rib on the other panel unit so as to define a mutualangle at which said panel units abut, a plurality of coupling projections at said edge surfaces of each panel unit and at the wall surface of each panel unit, said projections having apertures substantially coaxially arranged, said projections on one unit projecting between the projections on the other panel unit, and a common locking rod extending through said apertures, each coupling projection being substantially rectangular and firmly connected to the narrow edge surface and wall surface of the respective panel unit, and substantially filling up the cross section of a channel defined by the narrow edge surfaces and wall surfaces when the angle guide surfaces on both panel units abut each other, each coupling projection having integrally connected thereto an auxiliary rib provided with an inclined auxiliary angle guide surface cooperating with a corresponding inclined auxiliary angle guide surface on a corresponding auxiliary rib on the other panel unit.

2. The combination claimed in claim 1, wherein the common axis of the apertures of the projections on the first panel unit is slightly displaced with respect to the common axis of the apertures of the projections on the second panel unit, whereby the locking rod when inserted presses on the aperture edges of the projections.

3. The combination as claimed in claim 1, wherein at least two projections on one panel unit extend between two neighboring projections on the other panel unit.

4. The combination as claimed in claim 1, comprising resilient projections extending into the apertures.

5. The combination as claimed in claim 1, wherein at least some of said resilient projections point outside the center of the respective aperture.

6. The combination according toclaim 1, wherein said inclined angle guide surfaces of the auxiliary ribs form an angle of substantially 45° with the wall surface of the respective panel unit.

7. The combination as claimed in claim 1, wherein the coupling projections have a length substantially equal to the thickness of the panel unit, said length being measured in a direction perpendicular to the edge surface of the panel unit.

8. The combination according to claim 1, wherein on each unit at least one of the coupling projections at its end remote from the edge surface is provided with a stabilizing fin projecting to one side, the stabilizing fin on the projection of one panel unit facing a direction opposite to the stabilizing fin of the projection on the other panel unit.

9. The combination according to claim 8, wherein said fins are triangular.

10. The combination according to claim 1, wherein said retangular coupling projections are quadratic.

* * * * *